Patented June 10, 1930

1,762,474

UNITED STATES PATENT OFFICE

ERIC BERKELEY HIGGINS, OF BRENTFORD, ENGLAND, ASSIGNOR OF ONE-HALF TO BRITISH SYNTHETICS LIMITED, OF BRENTFORD, ENGLAND, A COMPANY OF GREAT BRITAIN

PROCESS FOR THE PREPARATION OF ARYLIDES OF 2-HYDROXY-3-NAPHTHOIC ACID

No Drawing. Application filed November 26, 1926, Serial No. 151,021, and in Great Britain December 28, 1925.

This invention relates to the manufacture of intermediate products suitable for use in producing azo dyestuffs, said intermediate products comprising the arylides of 2 hydroxy 3 naphthoic acid and in particular the anilide of that acid.

If 2 hydroxy 3 naphthoyl chloride is brought into intimate contact with an amine, for example aniline, both substances being used in the pure state or diluted in a solvent, the reaction will proceed practically quantitatively as regards the acid chloride, but only to about 50 per cent of the theoretical amount as regards the amine owing to the side reaction set up due to the presence of the liberated hydrochloric acid. In the case of aniline, for example, the reaction probably proceeds according to the equation:—

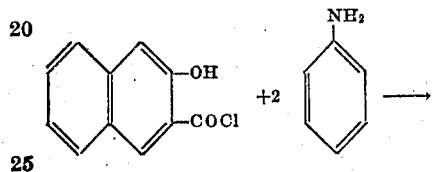

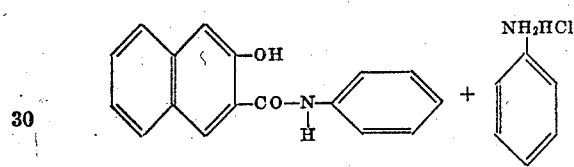

According to the present invention, then, an arylide of 2 hydroxy 3 naphthoic acid is produced by causing the appropriate amine to react with 2 hydroxy 3 naphthoyl chloride in the presence of a weak alkali such as sodium bi-carbonate or soda ash. The main object of the present invention is to enable the reaction to proceed practically quantitatively even as regards the amine. Thus the present invention provides certain methods for effecting the reaction between 2 hydroxy 3 naphthoyl chloride and an amine, for example aniline, the reaction being carried out in the presence of a weak alkali, as mentioned above. In the case of aniline and sodium bi-carbonate, the reaction takes place according to the equation:—

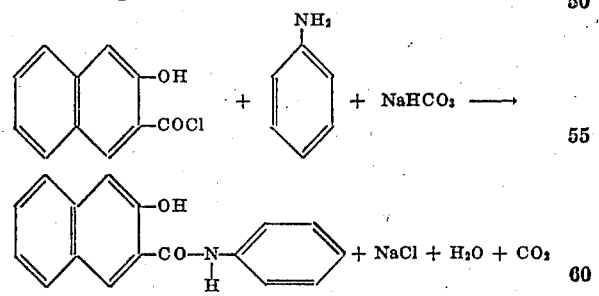

It will be recognized that this process is an application of the well-known Schotten and Baumann synthesis to the chloride of 2 hydroxy 3 naphthoic acid. It is found, however, that if it is attempted to carry out the process in the usually recognized manner for the Schotten and Baumann reaction, that is to say, by adding the acid chloride either as such or dissolved in a solvent to an aqueous suspension of the amine in the presence of an alkali, such as sodium carbonate, the alkali being added in corresponding small quantities so as to keep the reaction mass just alkaline, the yield is not satisfactory. The reason probably is due to the mutual small miscibility of the solid 2 hydroxy 3 naphthoyl chloride or a non-aqueous solution of it, the amine and the water.

Surprising results in regard to yield, are, however obtained if the reaction is effected in one of the following ways. The reaction may be carried out by mixing the amine in question with a weak alkali and sufficient water to form a paste and subsequently adding 2 hydroxy 3 naphthoyl chloride with vigorous mixing; the said chloride may be in the solid form or dissolved in or suspended in an indifferent medium, such as benzene. Another method according to the present invention consists in mixing the 2 hydroxy 3 naphthoyl chloride either in the solid form or as a solution or suspension in an indifferent medium with a weak alkali and the amine, and then finally adding water. A third method in accordance with the invention for carrying out the above mentioned reaction consists in mixing the 2 hydroxy 3 naphthoyl chloride either in the solid form or as a solution or suspension in an indifferent medium with the amine and adding the mass little by little to a solution of weak alkali with continuous agitation. In carrying out the invention, the amine employed may be a simple aromatic amine containing no electro-negative substituent, but in addition acid-substituted amines, for example, nitro-, halogenated or other acid substituted amines may be employed equally well.

In order that the invention may be clearly understood and readily carried into effect and, at the same time, the necessary conditions for carrying out the new process may be appreciated, some methods of carrying out the reaction in accordance with the invention will now be more fully described.

According to the first method, the amine together with slightly more than the theoretical quantity of weak alkali, for example soda ash, is mixed with a small quantity of water into the form of a paste. The 2 hydroxy 3 naphthoyl chloride, either as such or in solution or suspension in benzene is added little by little to the paste with very efficient mixing. After stirring thoroughly for about half an hour, water is added in small quantities at a time with continuous stirring and finally, the benzene is driven off preferably by naked steam. After the removal of the solvent, the suspension is rendered neutral to phenol phthalein—since the arylides are somewhat soluble in hot concentrated sodium carbonate—filtered and washed.

The following is an example of this first method. 93 grammes of aniline are mixed into a paste with 100 grammes of sodium bi-carbonate and 50 grammes of water. A suspension or solution of 206.5 grammes of 2 hydroxy 3 naphthoyl chloride in 200 grammes of benzene is slowly added to the pasty mixture whilst efficiently stirring or grinding; the temperature of the mixture must not substantially exceed 60 degrees C. After the whole of the acid chloride has been added, stirring may be continued for half an hour; 100 grammes of water are then slowly added, and the benzene driven off by the direct contact of steam. Hydrochloric acid is then added in small quantities at a time so as to bring the mass in a condition neutral to phenol phthalein, and the arylide washed and dried. The yield obtained is 97 per cent or more of the theoretical yield, although much depends upon thoroughly efficient mixing. This example may be employed with other simple aromatic amines. For example, if 143 grammes of β-naphthylamine be mixed into a paste with 100 grammes of sodium bi-carbonate and 60 grammes of water and the process be otherwise carried out as in the above example, the yield is round about 97 per cent of the theoretical. According to another example of this first method 138 grammes of metanitraniline are mixed into a paste with 100 grammes of sodium bi-carbonate and 60 grammes of water. A suspension or solution of 206.5 grammes of 2 hydroxy 3 naphthoyl chloride in 200 grammes of benzene is slowly added to the pasty mixture whilst efficiently stirring or grinding; the temperature of the mixture must not materially exceed 60 degrees C. After the whole of the acid chloride has been added, stirring may be continued for half an hour. 100 grammes of water are then slowly introduced and the benzene driven off by direct contact of steam. Hydrochloric acid is then added in small quantities at a time so as to bring the mass into a condition neutral to phenol phthalein and the arylide washed and dried. Although the yield depends to some extent upon thoroughly efficient mixing, a practically quantitative yield is obtained.

A second method of carrying out the reaction consists in thoroughly grinding the amine selected with slightly more than the equivalent quantity of weak alkali, as for example sodium bi-carbonate. Then the theoretical amount of 2 hydroxy 3 naphthoyl chloride, either as such, that is in the solid condition or in solution or suspension, in a suitable solvent, for example benzene is slowly added to the mixture of alkali and amine with continuous stirring preferably combined with grinding. If the acid chloride be used as such, the resultant mixture is a dust-dry fine yellowish powder. If a solution of acid chloride be used, the result is a yellowish paste. At this stage, approximately half of the added amine has reacted. Water is now added in small quantities at a time to the mass with continuous grinding. When a suitable amount of water has been added and the effervescence has ceased, the arylide is isolated after removal of benzene by the direct contact of steam, if this has been used, by rendering the mass neutral to phenol phthalein, filtering and washing.

The following are particulars of one example of carrying out the second method:—200 grammes of sodium bi-carbonate are ground together with 160 c. c. of aniline and 364 grammes of solid 2 hydroxy naphthoyl chloride are added to the mixture and the substances ground together, with the result that the mass falls to a dust-dry yellow powder. Whilst continuing to stir, 800 c. c. of water are added little by little and the stirring continued until frothing has practically ceased. The mass is now diluted with water up to a volume of 2000 c. c., filtered, washed and dried, it being already neutral to phenol phthalein. The yield obtained is the theoretical yield. The above example also gives 97 per cent or more of the theoretical yield if instead of the aniline, the equivalent weight of α-naphthylamine is used.

A second example of the second method may be carried out as follows:—170 c. c. of aniline are mixed with 200 grammes of sodium bi-carbonate and 377 grammes of 2 hydroxy 3 naphthoyl chloride are dissolved in 400 c. c. of benzene at a temperature not substantially exceeding 60 degrees C. and then slowly added to the mixture with continuous stirring. 1000 c. c. of water are now added little by little with continuous stirring and after the frothing has subsided the benzene is driven off by direct contact of steam, the mass rendered neutral to phenol phthalein and the arylide separated by filtration, washing and drying. The yield obtained is practically the theoretical yield. According to a third example of this second method 200 grammes of sodium bi-carbonate are ground together with 268 grammes of metanitroparatoluidine and 364 grammes of solid 2 hydroxy 3 naphthoyl chloride are added to the mixture and the substances ground together, with the result that the mass falls to an orange yellow dust-dry powder. The stirring is continued and 800 c. c. of water are added little by little, the stirring being continued until frothing has practically ceased. The mass is now diluted with water up to a volume of 2000 c. c., filtered, washed and dried, it being already neutral to phenol phthalein. The yield obtained is practically the theoretical yield.

A fourth example of the second method may be carried out as follows:—296 grammes of 2:5 di-chloraniline are mixed with 200 grammes of sodium bi-carbonate and 377 grammes of 2 hydroxy 3 naphthoyl chloride are dissolved in 400 c. c. of benzene at a temperature not substantially exceeding 60 degrees C. and then slowly added to the mixture with continuous stirring. 1000 c. c. of water are now added little by little with continuous stirring and after the frothing has subsided the benzene is driven off by direct contact of steam, the mass rendered neutral to phenol phthalein and the chloro-arylide separated by filtration, washing and drying. The yield obtained is practically the theoretical yield.

This second method admits of various small variations. As an example the following may be cited:—4 grammes of 2 hydroxy 3 naphthoyl chloride are ground with 3.7 grammes of sulphanilic acid and 2 grammes of anhydrous sodium carbonate, the whole mixed in the mortar and then water added little by little until frothing has ceased. The reaction is practically quantitative, about 50 per cent only of the material produced, that is the 2 hydroxy 3 naphthoic-para-sulpho-anilide can be recovered by filtering; the remainder being in solution in the water added, from which however it can be recovered in simple manner.

Yet a third method of carrying out the reaction is the following:—The 2 hydroxy 3 naphthoyl chloride, either as such, that is in the solid condition, or in solution in a suitable solvent, is brought into contact with the amine, with continuous stirring. The reaction is very swiftly completed, approximately 50 per cent of the amine having thus reacted. The mass is now added little by little to weak alkali, for example sodium carbonate or bicarbonate in the presence of water and with continuous stirring. The subsequent procedure is exactly as in the second method described above.

The following may be given as an example of this third method:—107 grammes of ortho toluidine are mixed with 206.5 grammes of 2 hydroxy 3 naphthoyl chloride in the dry, solid condition, or as a suspension or solution in a suitable solvent, such as benzene. After the mass is thoroughly incorporated it is run into a paste formed of 100 grammes of sodium bicarbonate in 100 grammes of water. The mass is thoroughly mixed and the arylides isolated as in the previous examples.

If the last given example is carried out by using the equivalent weight of ortho-anisidine in place of the ortho toluidine, the yield obtained is 97 per cent or more of the theoretical yield.

The following is another example of the third method:—138 grammes of para-nitraniline are mixed with 206.5 grammes of 2 hydroxy 3 naphthoyl chloride in the dry solid condition or as a suspension or solution in a suitable solvent, such as benzene. After the mass is thoroughly incorporated it is run into a paste formed of 100 grammes of sodium bicarbonate in 100 grammes of water. The mass is thoroughly mixed and the nitro arylide isolated as in the previous examples, a yield of 97 per cent or more of the theoretical yield being obtained.

It will be understood, of course, that the above examples do not exhaust the possibilities of the present invention. For example, five simple aromatic amines are mentioned in particular, but of course any other simple aromatic amines containing no electro-negative substituent may be employed. Also any other acid-substituted or halogenated amines may be employed, such as, for example, ortho-brom-aniline, 5-nitro-1-napthyl-amine, β-naphthylamine mono-sulphonic acids, 2-napthylamine-6-sulphonic acid, 3-nitro-5-chlor-4-toluidine, and so forth. Also the amine specified in any one of the above particular examples, may be employed in equivalent amount in any other one of the examples given. Furthermore, in the examples in which the 2 hydroxy 3 naphthoyl chloride is in suspension or solution, the suspending agent mentioned in benzene, but of course other suitable suspending or diluting agents may be used instead. And, again the invention is not confined to the use of sodium bi-carbonate since any other equivalent alkali may be used instead such as potassium carbonate, calcium carbonate or even dilute caustic soda, although in general, the best results are obtaned by the use of sodium bi-carbonate.

If the 2 hydroxy 3 naphthoyl chloride is prepared by the customary method, viz. by treating the 2 hydroxy 3 naphthoic acid with thionyl chloride, temperatures not substantially exceeding 60 degrees C. must be used, for higher temperatures cause internal condensation of the acid which becomes extremely rapid about 100 degrees C.; also care must be taken that no excess of thionyl chloride remains in the mass before it is used, since thionyl chloride can react with the amine to produce an undesirable by-product. For this reason, it is advisable to employ a slight excess of the 2 hydroxy 3 naphthoic acid which passes unchanged through the reaction and can be, and is recovered from the final liquors, in known manner.

In all of the methods set out above it is not necessary to heat the constituents except in so far as it is desired to economize in solvent when the 2 hydroxy 3 naphthoyl chloride is used in suspension or solution in a solvent, such as benzene, and in this case the temperature must not exceed 60 degrees C. to a material extent in any event. The reason is that at higher temperatures the hydroxynaphthoyl chloride suffers internal condensation, producing a body insoluble in aqueous solution of caustic alkali, but which still retains some phenolic properties. The reactions, therefore, are all completed at the ordinary air temperature, or at least below 60 degrees C.

Having thus described my invention, what I claim as new and desire to secure by Letters Patent is:—

1. The process for making an arylide of 2 hydroxy 3 naphthoic acid which consists in mixing under substantially non-aqueous conditions a primary aromatic amine and a weak alkali with 2 hydroxy 3 naphthoyl chloride and subsequently adding water to the mixture.

2. The process for making an arylide of 2 2 hydroxy 3 naphthoic acid which consists in mixing under substantially non-aqueous conditions a primary aromatic amine and a weak alkali with 2 hydroxy 3 naphthoyl chloride suspended in an indifferent medium and subsequently adding water to the mixture.

3. The process for making the anilide of 2 hydroxy 3 naphthoic acid which consists in mixing under substantially non-aqueous conditions aniline and a weak alkali with 2 hydroxy 3 naphthoyl chloride in suspension in an indifferent medium and subsequently adding water to the mixture.

4. The process for making an arylide of 2 hydroxy 3 naphthoic acid, which consists in mixing under substantially non-aqueous conditions a primary aromatic amine with 2 hydroxy 3 naphthoyl chloride, introducing a substance with a weak alkaline reaction, and treating the mixture with water only after the amine has been in contact with the acid chloride.

5. The process for making the anilide of 2 hydroxy 3 naphthoic acid, which consists in mixing under substantially non-aqueous conditions aniline with 2 hydroxy 3 naphthoyl chloride, introducing a substance with a weak alkaline reaction, and treating the mixture with water only after the aniline has been in contact with the acid chloride.

6. The process for making an arylide of 2 hydroxy 3 naphthoic acid, which consists in mixing under substantially non aqueous conditions a primary aromatic amine with 2 hydroxy 3 naphthoyl chloride, introducing sodium bi-carbonate, and treating the mixture with water only after the amine has been in contact with the acid chloride.

7. The process for making the anilide of 2 hydroxy 3 naphthoic acid, which consists in mixing under substantially non-aqueous conditions aniline with 2 hydroxy 3 naphthoyl chloride, introducing sodium bi-carbonate, and treating the mixture with water only after the aniline has been in contact with the acid chloride.

In witness whereof I hereunto subscribe my name this 15th day of November, 1926.

ERIC BERKELEY HIGGINS.